7371X
Ira Gay
Platform Balance.
Patented Jan. 14. 1833.
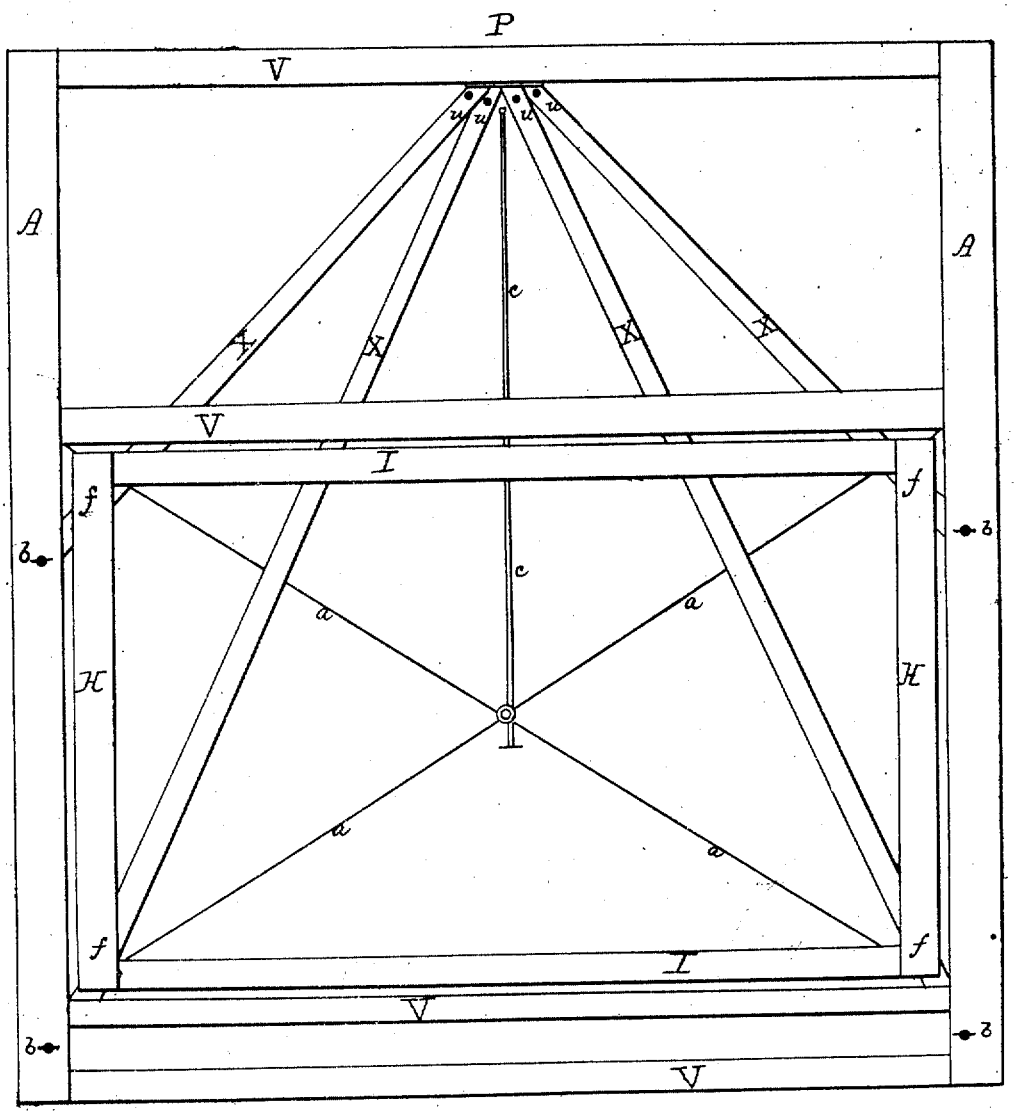

7371X Jan 14 1833

Ira Gay Letters Patent dated 14th Jany 1833

The schedule referred to in these Letters Patent and making part of the same, containing a description in the words of the said Ira Gay himself of his improvement in the construction arrangement & application of Levers - for the support of a platform for weighing usually called. The Platform Balance.

---

The platform is constructed of wood & elevated one or two feet above the surface of the ground & over a pit or cellar of any conve-nient depth from four to six feet: the outer sill resting on the walls the frame may be of any dimensions & the timbers composing it of any convenient size.... The frame represented on the annexed plan is 15 feet long & 14 feet wide, the moveable platform is 12 feet six inches by 8 feet: the end & side timbers of which only are represented, the former six & the other four inches wide & may be from six to ten inches deep, or of such depth as to give them sufficient strength.... The whole frame is to be filled with joists and covered with planks.. A house or shed to cover the Stilyard or scale beam & the passage into the pit may be erected on that part of the frame which is not occupied by the moveable platform. — It may be about ten by four feet.... On the annexed plan A.A. represents the side sills V.V.V.V. the cross sills H.H the end & I.I. the side timbers of the move-able platform & X.X.X.X. the four levers which raise it........ These levers are suspended at one end under the sills by means of iron snipebills or bolts of about one inch diameter, with an eye at one end: one passing up thro' the sill & keyed on the upper side, ... the other down thro' the lever & keyed on the lower side and con-nected thro' the eyes by a link three inches long, leaving a space between the under side of the sill & the upper side of the lever of about four inches.

The bolts thro' the sill are represented at b.b.b.b..... at the distance of one tenth part of the length of the levers from the bolts, are the fulcra at f.f.f.f. under the end timbers of the moveable platform.

7371X 47

The fulcra should be made in such form & of such material as cause the least friction. Metal is preferable to wood.

The levers converge to a point near P. on which in the shed above is placed the Scale beam: from the end of which a chain is suspended extending within twelve or fifteen inches of the levers & then dividing into four parts, each of which is attached to a lever at e— ...... The platform balance now commonly in use differs from this in no other respect than in the arrangement & number of levers; having five and this four & are plac-ed as represented on the plan by the levers a, a, a, a, & e.e. being four diagonal levers under the platform & extending from its four corners to the centre & there resting on the fulcrum of the fifth lever e. e. extending to near under the scale beam.

The diagonal levers are of iron the other of wood.

In the improved one: the levers are all of wood four or five inches wide & from ten to twelve inches deep diminishing from the fulcrum to the end under the scale beam to six or seven inches in depth.

The improvement which I claim to have discovered is in the arrange-ment & application of the levers: being less liable to accident & more simple & less expensive in the construction.

Witness
Thomas Farone
Isaac Spalding

Ira Gay

[illegible]

(Rec.d & Recorded anew 17th Sept. 1846)

Ex.d
[illegible]